Aug. 2, 1938.   S. NELSON   2,125,471
FRANKFURTER BROILER
Original Filed Oct. 27, 1934   2 Sheets-Sheet 1
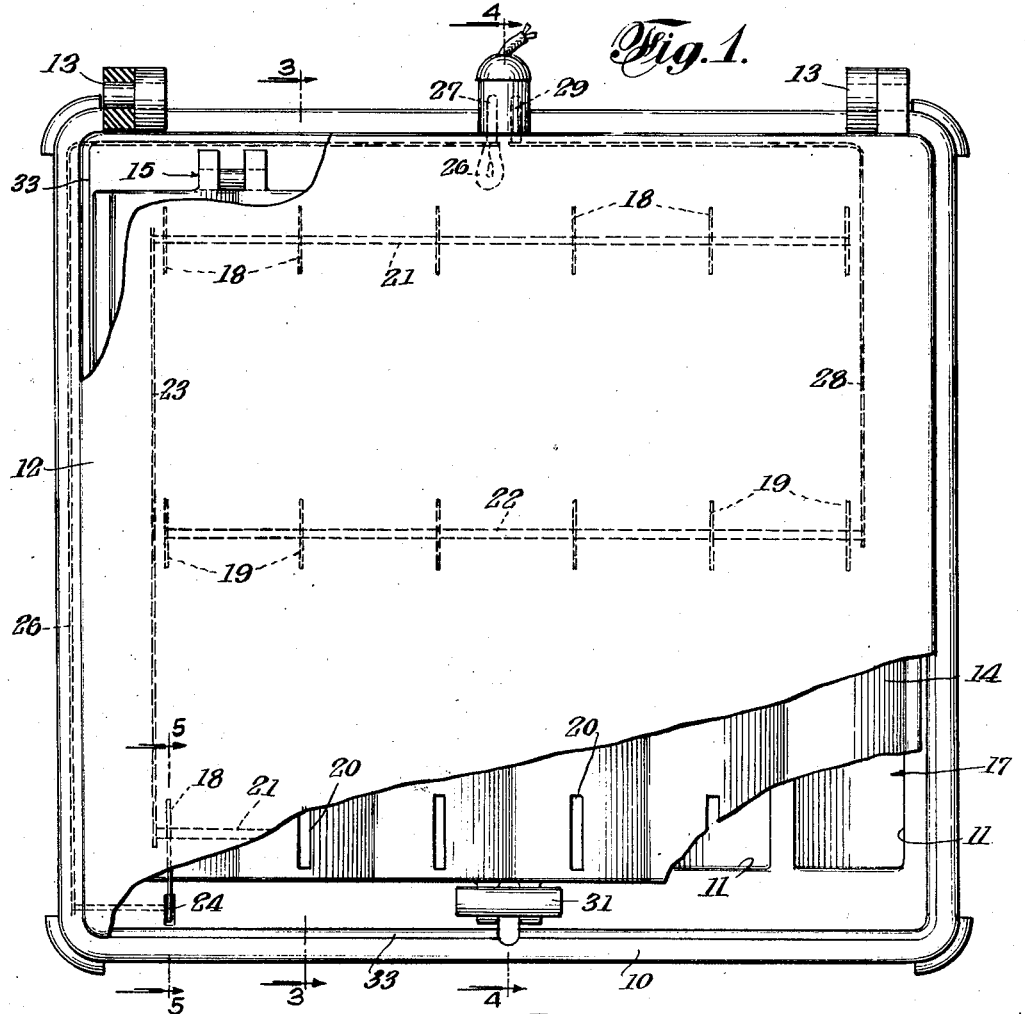
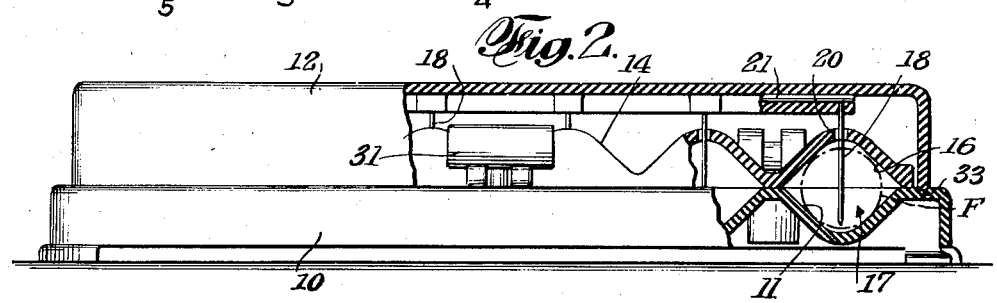
INVENTOR
STEWART NELSON
ATTORNEY Aug. 2, 1938.　　　　　S. NELSON　　　　　2,125,471
FRANKFURTER BROILER
Original Filed Oct. 27, 1934　　　2 Sheets-Sheet 2
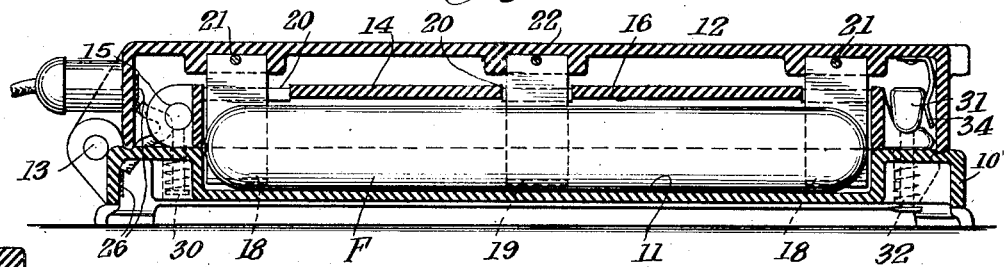
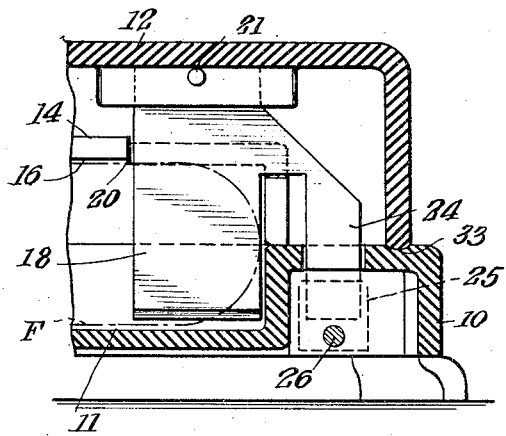
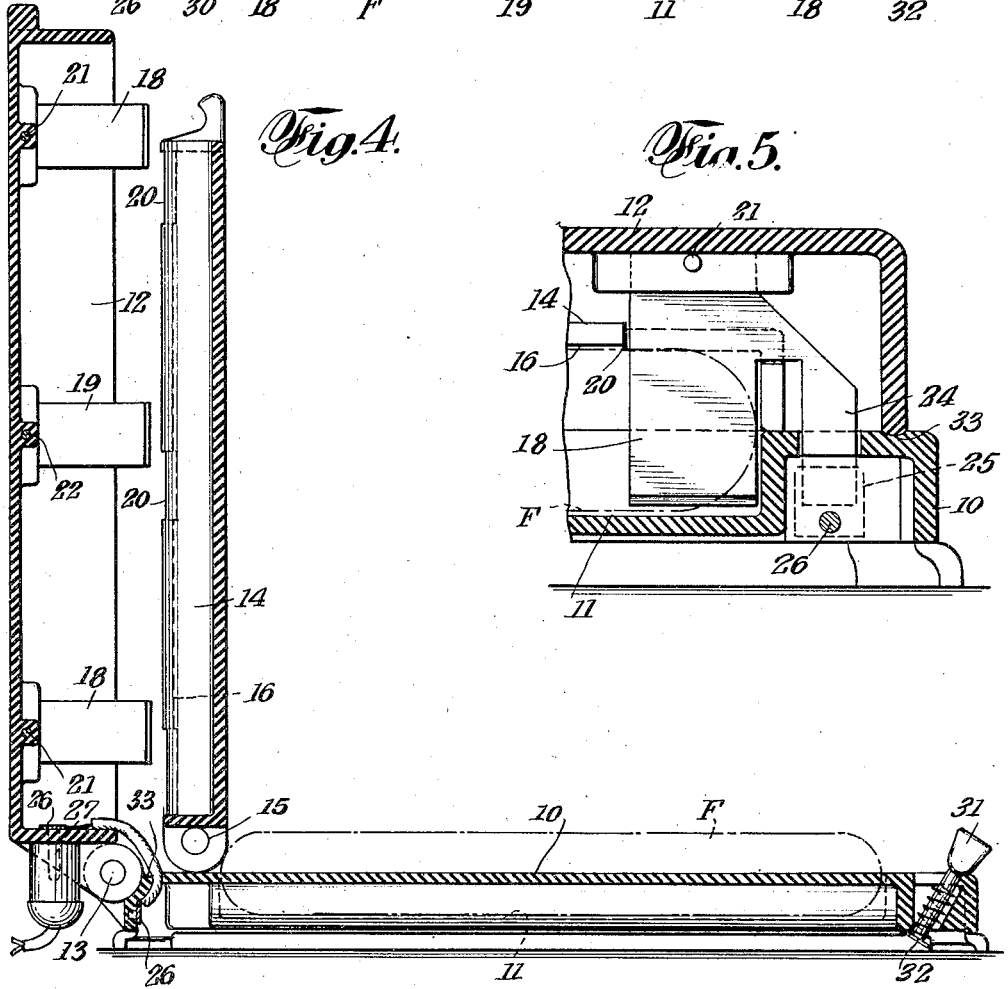
INVENTOR
STEWART NELSON
BY
ATTORNEY Patented Aug. 2, 1938

2,125,471

UNITED STATES PATENT OFFICE 2,125,471

FRANKFURTER BROILER

Stewart Nelson, New York, N. Y.

Application October 27, 1934, Serial No. 750,242
Renewed January 5, 1938

3 Claims. (Cl. 219—19)

This invention relates to frankfurter broilers and particularly to broilers wherein a high potential electric current is passed through the frankfurters which act as resistance to the flow of electric current and thereby producing the heat for broiling.

The objects of the invention are to provide a simple, inexpensive apparatus for the purpose which is economical in use especially in public places where continuous dispensing of broiled frankfurters is desired; to provide an improved broiler which is foolproof in operation; to provide a broiler of this character which may be readily cleaned of the drippings of fat or the like inherent in articles of food such as frankfurters; etc.

With these objects in mind and others later apparent, the invention comprises the combination and arrangement of parts as exemplified in the accompanying drawings, described in the following specification and in which:—

Fig. 1 is a plan view of a preferred form of broiler, parts being broken away for clearer illustration.

Fig. 2 is a front view thereof, portions being in section.

Fig. 3 is a sectional view through the line 3—3 of Fig. 1.

Fig. 4 is a similar view as taken along the line 4—4 of Fig. 1 with the covers raised.

Fig. 5 is enlarged fragmentary sectional view through the switch mechanism as taken along the line 5—5 of Fig. 1.

The device generally comprises a base 10 of a non-conducting material and provided with cavities 11 into which may be placed frankfurters or the like; an outer cover 12 hinged to the base at 13 and preferably at the rear thereof; and an intermediate cover member 14 pivoted to the base 10 at 15 and provided with cavities 16 registering with the respective cavities 11 to provide chambers 17 in which the frankfurters "F" are disposed.

In the present instance it is desired to pass electric current into both ends of the frankfurters and out through the middle thereof or vice versa and for this purpose each chamber 17 is adapted to have knives such as 18 disposed in its ends and a knife 19 disposed in the longitudinal middle thereof. These knives are preferably carried by the outer cover and are adapted to pass through slots or openings 20 in the intermediate cover.

Each of the groups of knives 18 are connected electrically as by means shown at 21 and the knives 19 are similarly connected as at 22. Since the knives in group 19 form one electric terminal and the knives 18 the other, the two groups 18 are in turn connected together as at 23.

One of the knives in group 18 is preferably provided with a switch blade portion 24 adapted to cooperate with connection means carried by the base such as shown at 25 and which is connected by the conductor 26 to one terminal prong 27. The conductor 22 for the knives 19 is connected by means of conductor 28 to the other terminal prong, 29.

In this manner current may be conducted to a frankfurter in any of the chambers 17 as follows:—from a current source to the prong 27, conductor 26, switch members 25, switch blade 24, the knife carrying said switch blade, conductor 23, both conductors 21, and the knives 18 serving that chamber, through the frankfurter to knife 19, conductor 22, conductor 28, prong 29, to the other pole of the current source. The current flow may, of course, be reversed and though the results are not good, it is conceivable to employ A. C. instead of the D. C. here contemplated.

In order to provide for the accommodation of frankfurters larger than the chambers 17, the hinges 15 are yieldingly mounted at 30 and the swing bolt latch 31 at the front is also yieldingly mounted as at 32. This type of mounting is provided to insure the frankfurters being firmly held and confined in their cavities as shown.

In order to confine the heat generated within the broiler, means such as shown at 33 may be utilized between the base 10 and the cover 12 to minimize the heat losses.

The cover 12 may be provided with means such as the latch retension means 34 so the natural swelling of the frankfurters when being cooked will not cause inadvertant unlatching of the intermediate member.

It will be noted that it is impossible to inadvertantly bridge the electric circuit when the cover is raised due to the separation between the blade 24 and the switch members 25 and also that all the parts of the apparatus may be thoroughly cleaned on all surfaces due to the novel hinging arrangement of the parts.

While the foregoing is descriptive of a preferred embodiment of the invention, it should be understood that many changes in the form, size and arrangement of the parts may well be made without departing from the true spirit and scope of the invention as defined in the following claims.

From the foregoing it will be seen that a simple device for the purpose has been disclosed in the preferred form of its embodiment, but it is not desired to restrict the details to the exact construction shown, it being obvious that changes, not involving the exercise of invention, may be made without departing from the scope of the appended claims.

1. A frankfurter broiler comprising a base having cavities receptive of frankfurters, a cover hinged thereto, a frankfurter piercing knives carried by the cover and adapted to enter said cavities when the cover is closed, means to conduct electric current to the knives, and means to yieldingly confine the frankfurters in their respective cavities, said means comprising an intermediate cover member having cavities complementary to the base cavities, said member having one end yieldingly hinged to the base and its other end yieldingly latchable to the base.

2. A frankfurter broiler comprising a base having cavities receptive of frankfurters, a cover hinged thereto, frankfurter piercing knives carried by the cover and adapted to enter said cavities when the cover is closed, means to conduct electric current to the knives, and a member intermediate the cover and base to yieldingly confine the frankfurters in their respective cavities and having cavities complementary to the base cavities, said member having one end hinged to the base and the other end engageable with a yieldable latch swingably carried by said base.

3. A frankfurter broiler comprising a base having cavities receptive of frankfurters, an intermediate cover member having cavities complementary to the base cavities, the base cavities and member cavities together, forming tubular chambers a main cover hinged thereto, frankfurter piercing knives carried by the main cover and adapted to pass through slits in the intermediate cover and enter said chambers when the cover is closed, a source of electric current, means to conduct said current to said knives, a switch in the circuit operable by the main cover, said base and intermediate cover member when closed, constituting means to confine the frankfurters in their respective chambers, said intermediate cover also serving to "strip" the frankfurters from the knives as the main cover is raised.

STEWART NELSON.